United States Patent [19]

Bianchi

[11] 4,045,236
[45] Aug. 30, 1977

[54] CELLULAR CEMENT COMPOSITION

[75] Inventor: Giuseppe Bianchi, Lerici (La Spezia), Italy

[73] Assignee: I.GE.Co. Z.r.l., Italy

[21] Appl. No.: 566,526

[22] Filed: Apr. 8, 1975

[51] Int. Cl.² ............................................. C04B 15/02
[52] U.S. Cl. ...................................... 106/88; 106/90; 106/97
[58] Field of Search .................... 106/97, 86, 88, 90

[56] References Cited

U.S. PATENT DOCUMENTS

| 3,307,588 | 3/1967 | Hylak | 106/97 |
| 3,795,721 | 3/1974 | Gilbert et al. | 106/88 |

*Primary Examiner*—J. Poer
*Attorney, Agent, or Firm*—Jacobs & Jacobs

[57] ABSTRACT

A cellular cement composition having a low specific gravity and a high tensile strength is described in which an alkali metal alkylbenzenesulfonate and a metal chloride are added to cement, inert fillers and water. Additional components which accelerate setting and hardening speeds as well as modify the viscosity of the composition prior to setting can also be present.

7 Claims, No Drawings

CELLULAR CEMENT COMPOSITION

DETAILED DESCRIPTION

The present invention pertains to a light cellular cement composition which is characterized by a high tensile strength and low specific gravity. The present cement composition is suitable for use in the prefabrication of reinforced concrete structures, particularly those uses in civil, industrial and maritime construction requiring a high tensile strength, such as for example weight bearing structures for floors, reinforced concrete ceilings, bridge supports, wall panels and like.

Various types of concrete compositions having a low specific gravity are known and used in the construction industry. Because of their low resistance to wear and their high friability, the use of such light concrete compositions is generally restricted to the construction of fittings for the finishing and facing operations. They are generally not suitable for the construction of prefabricated load bearing structures.

One such light concrete composition is pumice beton which has a specific gravity of about 1300 k./m$^3$ and an ultimate tensile strength of less than 20k./cm$^2$. Other compositions are known in which a low specific gravity is achieved through the incorporation of materials generating gas bubbles. Such compositions are suitable only for non-weight bearing applications such as ceilings and facing panels since, while having a specific gravity of from about 700 to about 1200 k./m$^3$, they have tensile strength of around 6 to 12 k./cm$^2$. A further known composition combines cement mortar with a high percentage of water and includes in this mixture aluminum dust or aluminum alloy dust. This material which can be used in preparing panelling plates has a specific gravity of from about 700 to about 1500 k./m$^3$ and a tensile strength of from 5 to about 42 k./cm$^2$.

As is apparent, these compositions are not suitable for weight bearing structures in view of their low tensile strength. In addition, these compositions exhibit a high degree of friability, making them particularly sensitive to friction and shock, and often display a surface upon casting which is highly irregular and cell-like. Such a surface while useful for example in sound deadening panels, represents a disadvantage if the structure is exposed to the elements, particularly frost. The time required for setting may also be extremely long and in addition, those compositions having a high percentage of water will frequently demonstrate partial settling in the course of setting.

The present invention pertains to a cement composition which overcomes the foregoing disadvantages. In particular, the present invention pertains to a light cement composition which has a low specific gravity, specifically from about 800 to about 1600 k./m$^3$, and which may be used in the formation of prefabricated weight bearing concrete structures as a result of its high ultimate tensile strength. This tensile strength can be as high as 250 k./cm$^2$. In addition, the present cement composition has a very low degree of friability and a high degree of resistance to shock. When cast, it presents a particularly solid and smooth outer surface which is highly water resistant. The composition possesses great fluidity prior to setting so that vibrators are not necessary and exhibits a very rapid setting time without the appearance of any separation as a result of settling. It demonstrates perfect casting uniformity during setting. After, for example, fifteen hours at room temperature, a casting demonstrates 35 to 45% of the resistance exhibited after 28 days.

The cement composition of the present invention is obtained by combining cement mortar, optionally but preferably with inert fillers, with water in the specified proportions and adding to this an alkali metal alkylbenzenesulfonate and a metal chloride. Typically a composition having a high tensile strength and a specific gravity of from about 800 k./m$^3$ to about 1600 k./m$^3$ is obtained by combining from about 300 to about 800 k of cement per m$^3$ of total composition with up to 1000 k. of inert filler per m$^3$ of composition. The final composition will also contain from about 36 to about 68% of water by weight. In addition to these conventional components, the present composition will contain an alkali metal alkylbenzenesulfonate, such as sodium alkylbenzenesulfonate or potassium alkylbenzenesulfonate, in an amount of from 1 to about 45% based upon the weight of water present and a metal chloride such as calcium chloride, ferric chloride, aluminum chloride, barium chloride and the like in an amount of from about 2 to about 35% of the weight of water present.

In addition to the above components, it is preferred that the cement composition contains an alkali metal or alkaline earth metal nitrate in an amount up to 70% by weight of water, triethanolamine in an amount of up to about 90% by weight of water, a metal sulfate in an amount of up to 10% by weight of water and/or a hydrated sodium silicate in an amount up to 60% by weight of water. Typical nitrates include calcium nitrate, sodium nitrate and potassium nitrate. Typical metal sulfates include sodium sulfate, magnesium sulfate, copper sulfate, zinc sulfate and lead sulfate. The hydrated sodium silicate may for example be the pentahydrate.

While not wishing to be bound by any explanation as to the precise function of each ingredient, it is believed that the alkali metal alkylbenzenesulfonate serves as a foaming agent and moreover maintains the integrity of the mixture until setting occurs. The metal chloride is believed to have an advantageous effect on the setting speed. A similar effect is believed to be produced by the nitrate and the triethanolamine while the sulfate is believed to act favorably upon the hardening speed of the composition. The silicate appears to have a gel-like effect which improves the viscosity of the mixture and eliminates the settling problem.

As indicated above, the cement composition will have a specific gravity of from about 800 to about 1600 k./m$^3$ and the tensile strength will in part be dependent upon the specific gravity of a particular composition. The specific gravity is in turn determined by the relative amounts of the cement and the inert ingredients and to a lesser degree by the other additives which are present. The effect of specific gravity on tensile strength can be seen from the following data representing typical compositions:

TABLE

| Composition | Specific Gravity (k./m$^3$) | Tensile Strength at 28 Days (k./cm$^2$) |
| --- | --- | --- |
| 1 | 800 | 40 – 90 |
| 2 | 1000 | 50 – 130 |
| 3 | 1200 | 60 – 150 |
| 4 | 1400 | 70 – 180 |
| 5 | 1600 | 160 – 250 |

Control of the specific gravity, in addition to adjustment of the above ingredients can also be achieved through variations in the amount of the alkali metal alkylbenzenesulfonate. Utilizing for example only 1% by weight of water of alkylbenzenesulfonate, one achieves the maximum specific gravity, namely 1600 k./m³, and thus maximum tensile strength, with a small amount of alkylbenzenesulfonate whereas an increase in the amount of this component results in a lower specific gravity and a somewhat lower tensile strength.

In the preparation of this cement composition, the cement, inert fillers and a portion of the water are combined in the usual fashion. The remaining ingredients other than the alkali metal alkylbenzenesulfonate are combined with a further portion of the total water and the alkali metal alkylbenzenesulfonate is dissolved in the remaining water. The first and second mixtures are combined, followed by the addition of the third mixture. Air is then blown into the composition, as for example through the application of compressed air or through rapid beating.

The resultant cement composition, following setting, shows a homogeneous distribution of microporosities which vary from about 0.1 to about 4 mm. in diameter.

The inert fillers which are utilized in this composition include the usual fillers utilized in concrete such as sand or gravel.

The following specific example will serve to typify the nature of this invention without being a limitation on the scope thereof, the scope being defined only by the appended claims.

EXAMPLE

| | |
|---|---|
| a) Cement | 700 kg/m³ of total composition |
| b) Sand | 500 kg/m³ of total composition |
| c) Water | 45 to 50% weight of cement |
| d) Sodium alkylbenzenesulfonate | 30 to 35% weight of water |
| e) Calcium nitrate | 5 to 7% weight of water |
| f) Calcium chlorate | 8 to 10% weight of water |
| g) Triethanolamine | 5 to 6% weight of water |
| h) Sodium sulfate | 5 to 6% weight of water |
| i) Sodium silicate | 15 to 20% weight of water |

What is claimed is:

1. A light, high tensile strength cellular cement composition having a homogeneous distribution of microporosities of diameters of from 0.1 to 4 mm sufficient to produce a specific gravity of from about 800 k/m³ to about 1600 k/m³, said composition containing from about 300 to 800 k of cement per m³ of composition, up to 1000 k of inert fillers per m³ of composition and from 36 to 68% water by weight of composition, and further containing an alkali metal alkylbenzenesulfonate in an amount of from 1 to 45% by weight of water and a metal chloride in an amount of from 2 to 35% by weight of water.

2. A cement composition according to claim 1 further containing an alkali metal or alkaline earth metal nitrate in an amount of up to 70%, triethanolamine in an amount of up to 90%, a metal sulfate in an amount of up to 10% and a hydrated sodium silicate in an amount of up to 60%, all percentages being by weight based on water present.

3. A cement composition according to claim 2 wherein the alkali metal alkylbenzenesulfonate is a sodium alkylbenzenesulfonate.

4. A cement composition according to claim 2 wherein the alkali metal or alkaline earth metal nitrate is calcium nitrate.

5. A cement composition according to claim 2 wherein the metal sulfate is sodium sulfate.

6. A cement composition according to claim 2 wherein the hydrated sodium silicate is the pentahydrate.

7. A cement composition according to claim 2 wherein the alkali metal alkylbenzenesulfonate is sodium alkylbenzenesulfonate, the alkali metal or alkaline earth metal nitrate is calcium nitrate, the metal sulfate is sodium sulfate and the hydrated sodium silicate is the pentahydrate.

* * * * *